US007004844B2

(12) United States Patent
Fraher

(10) Patent No.: US 7,004,844 B2
(45) Date of Patent: Feb. 28, 2006

(54) CLEARANCE DAMPING DEVICE FOR A TELESCOPING SHAFT ASSEMBLY

(75) Inventor: Mark C. Fraher, Goshen, CT (US)

(73) Assignee: Timken US Corporation, Torrington, CT (US)

(*) Notice: Subject to any disclaimer, the term of this patent is extended or adjusted under 35 U.S.C. 154(b) by 0 days.

(21) Appl. No.: 10/678,387

(22) Filed: Oct. 3, 2003

(65) Prior Publication Data
US 2005/0075174 A1 Apr. 7, 2005

(51) Int. Cl.
F16D 3/06 (2006.01)
(52) U.S. Cl. ..................... 464/162; 403/377
(58) Field of Classification Search ............ 403/359.1, 403/359.4, 359.5, 377, 379.6; 464/162, 182; 74/492, 493; 285/322; 280/775, 777
See application file for complete search history.

(56) References Cited

U.S. PATENT DOCUMENTS

| 2,313,780 | A | * | 3/1943 | Snyder | 285/322 X |
| 3,413,021 | A | * | 11/1968 | Potts | 285/322 X |
| 4,621,842 | A | * | 11/1986 | Kowal et al. | 285/322 |
| 4,756,640 | A | * | 7/1988 | Gehrke | 403/359.5 X |
| 6,105,456 | A | | 8/2000 | Higashino et al. | |
| 6,224,117 | B1 | * | 5/2001 | Olson et al. | 285/322 |
| 6,267,528 | B1 | | 7/2001 | Higashino | |
| 6,350,955 | B1 | * | 2/2002 | Daoud | 285/322 X |
| 6,722,704 | B1 | * | 4/2004 | Bartholoma et al. | |

* cited by examiner

Primary Examiner—Greg Binda
(74) Attorney, Agent, or Firm—Michael Best & Friedrich LLP

(57) ABSTRACT

A clearance damping element for use with a telescoping shaft assembly including a shaft having a shaft outer diameter and a tube configured to receive the shaft therein. The clearance damping element comprises a tube engaging portion and a shaft engaging portion. The tube engaging portion is adapted to fixedly receive the tube and the shaft engaging portion has a body extending from the second end of the tube engaging portion. The shaft engaging portion body includes a plurality of flexible fingers with inward extending projections that define an inner diameter less than the shaft outer diameter.

11 Claims, 6 Drawing Sheets

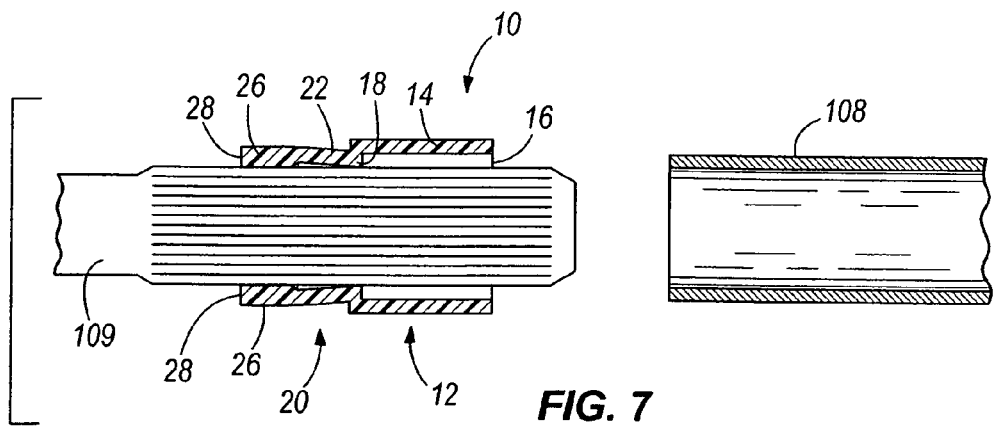
FIG. 7
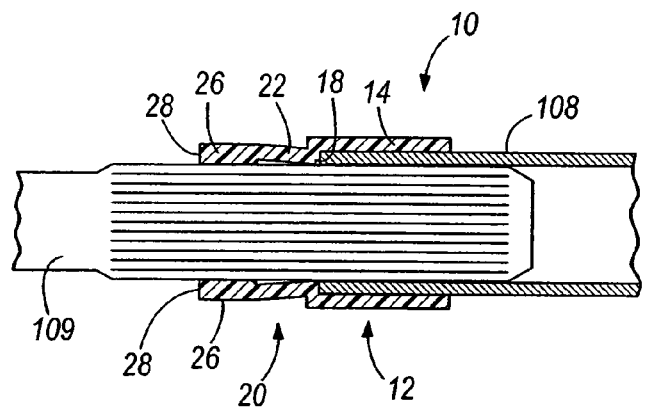
FIG. 8
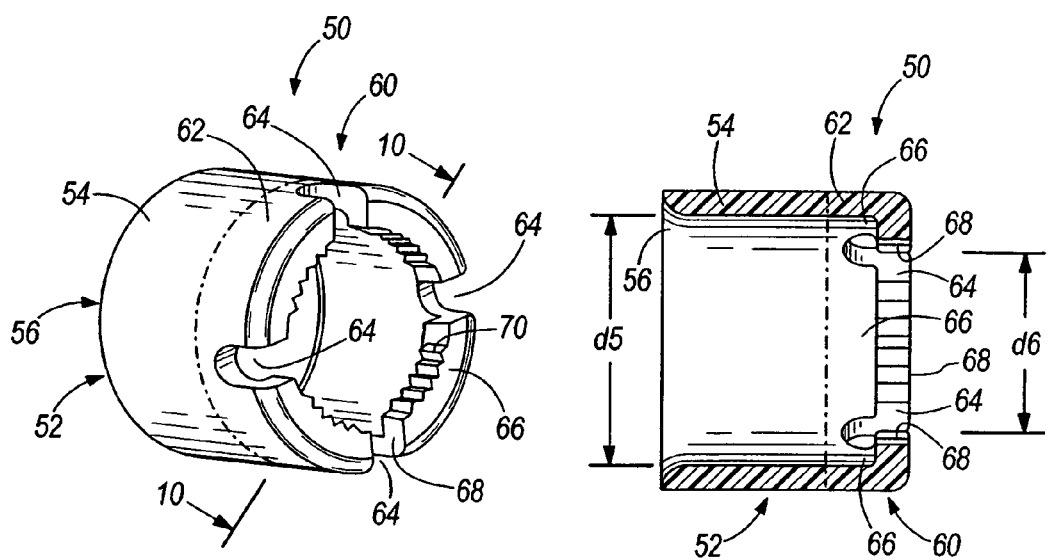
FIG. 9          FIG. 10

CLEARANCE DAMPING DEVICE FOR A TELESCOPING SHAFT ASSEMBLY

BACKGROUND

The present invention relates to an extendable shaft, for example, an intermediate shaft used in a steering apparatus of an automobile or the like.

It has hitherto been widely practiced that an expandable/contractible intermediate shaft is provided midway of a steering apparatus in order to prevent a steering wheel from thrusting a driver's body up in the event of a collision accident. This expandable/contractible intermediate shaft diminishes an entire length if a front portion of the automobile is crashed subsequent to a so-called primary impact in which the automobile collides with other automobile. Such an expandable/contractible intermediate shaft is constructed by making a serration or spline engagement between one end of an outer tube member and one end of a solid inner shaft member.

FIG. 1 shows one example of an automobile steering apparatus incorporating an intermediate shaft according to the present invention. A steering apparatus for an automobile involves the use of a mechanism, as schematically shown in FIG. 1, for transmitting a motion of a steering wheel to a steering gear. Referring to FIG. 1, a steering wheel 102 is fixed to a steering shaft 101 rotatably inserted through within a steering column 103. The steering column 103 is fixed to a schematically shown car body 106 through members 104, 105. Rotations of the steering shaft 101 are transmitted to a shaft 111 of an unillustrated steering gear portion via a steering intermediate shaft constructed of universal joints 107, 110 and shaft members 108, 109.

It is generally known that, in the thus constructed steering apparatus, the shaft member of the steering intermediate shaft is constructed as a mechanism for absorbing, when collided, an impact energy and a movement and a deformation of the steering apparatus by an entire length shrinking upon receiving an impact in order to protect a driver from a damage just when a vehicle collision happens. What is widely used as this mechanism is that the steering intermediate shaft is structured so that an outer tube member and a solid inner shaft member are combined with each other by a spline or serration engagement enough to permit a relative movement in the axial direction therebetween. To give an explanation with reference to FIG. 1, an upper portion 108 of the shaft member of the intermediate shaft is formed as a tube member the inner surface of which is formed with a serration or a spline, while a lower portion 109 is formed as a solid inner shaft member the outer surface of which is formed with the serration or the spline. Then, this solid inner shaft member is inserted into the tube member, thus making the serration or spline engagement.

It is, as described above, useful also when assembling the steering apparatus to give a degree of freedom of the axial movement to the intermediate shaft. When the vehicle is assembled, normally the steering gear portion for changing a direction of the wheel is at first fixed to a car body chassis, while the intermediate shaft portion is fixed to the body side integrally with the steering column, and these components are assembled afterward. This is a procedure of how the apparatus is assembled. To describe it referring to FIG. 1, the shaft 111 of the steering gear apparatus exists on the side of the chassis, and the portions higher than the universal joint 110 exist on the body side. When in the assembling process, it follows that the shaft 111 is joined to the joint 110. It is therefore necessary and useful for the intermediate shaft including the inner shaft member and the outer tube member to have the degree of freedom of the movement (expansion and contraction) in the axial direction.

Further, as disclosed in Japanese Utility Model Post-Exam Publication No. 63-17862, there has hitherto been known a structure for reducing backlash in the engaging portions between one end of the outer tube member and one end of the inner shaft member.

FIG. 2 shows an expandable/contractible intermediate shaft disclosed in this Japanese publication. An inner peripheral surface of an outer tube member P1 is formed with a female spline P2, and an outer peripheral surface of a solid inner shaft member P3 is formed with a male spline P4 engaging with the female spline P2. Further, slits P5, P5 each opening at one edge of the outer tube member P1 are formed in a plurality of positions in a circumferential direction of one end of the outer tube member P1. Moreover, a ring-like fastening member P6 is externally fitted to one end of the outer tube member P1. This ring-like fastening member P6 elastically fastens an inner peripheral surface of one end of the outer tube member P1 onto the outer peripheral surface of the solid inner shaft member in a state where the inner shaft member P3 is inserted into the outer tube member P1. Then, a backlash in engaging portions between the female and male splines P2, P4 is thereby prevented irrespective of a minute gap existing between the female spline P2 and the male spline P4.

While such an assembly has allowed for reduced lash and noise in the steering shaft assembly, such an assembly requires significant modification of the intermediate shaft outer tube. Such modification is generally costly and impractical based on the numerous variations of outer tubes utilized in various vehicles. A modification to the production process for each of these various tubes would be required. Furthermore, the ring-like fastening member P6 is a loose member which may be lost during production. Additionally, the ring-like fastening member P6 requires an extra assembly step, which if forgotten by assembly personnel will leave the ring-like fastening member to move and shake during vehicle operation and will further fail to provide the desired damping.

SUMMARY

The present invention provides a clearance damping element for use with a telescoping shaft assembly including a shaft having a shaft outer diameter and a tube configured to receive the shaft therein. The clearance damping element comprises a tube engaging portion and a shaft engaging portion. The tube engaging portion is adapted to fixedly receive the tube. The shaft engaging portion has a body extending from the second end of the tube engaging portion body. The shaft engaging portion body has a plurality of radially spaced axial slots therealong to define a plurality of flexible fingers, at least two of the fingers having inward extending projections that define an inner diameter less than the shaft outer diameter.

BRIEF DESCRIPTION OF THE DRAWINGS

FIG. 7 is a side elevation view similar to FIG. 6 with the clearance damping element positioned on the shaft.

FIG. 8 is a side elevation view similar to FIG. 7 with the tube positioned within the clearance damping element.

FIG. 9 a front isometric view of a clearance damping element of a second embodiment of the present invention.

FIG. 10 is a cross-section taken along the line 10—10 in FIG. 9.

DETAILED DESCRIPTION OF THE PREFERRED EMBODIMENTS

The present invention will be described with reference to the accompanying drawing figures wherein like numbers represent like elements throughout. Certain terminology, for example, "top", "bottom", "right", "left", "front", "frontward", "forward", "back", "rear" and "rearward", is used in the following description for relative descriptive clarity only and is not intended to be limiting.

Figure 6:
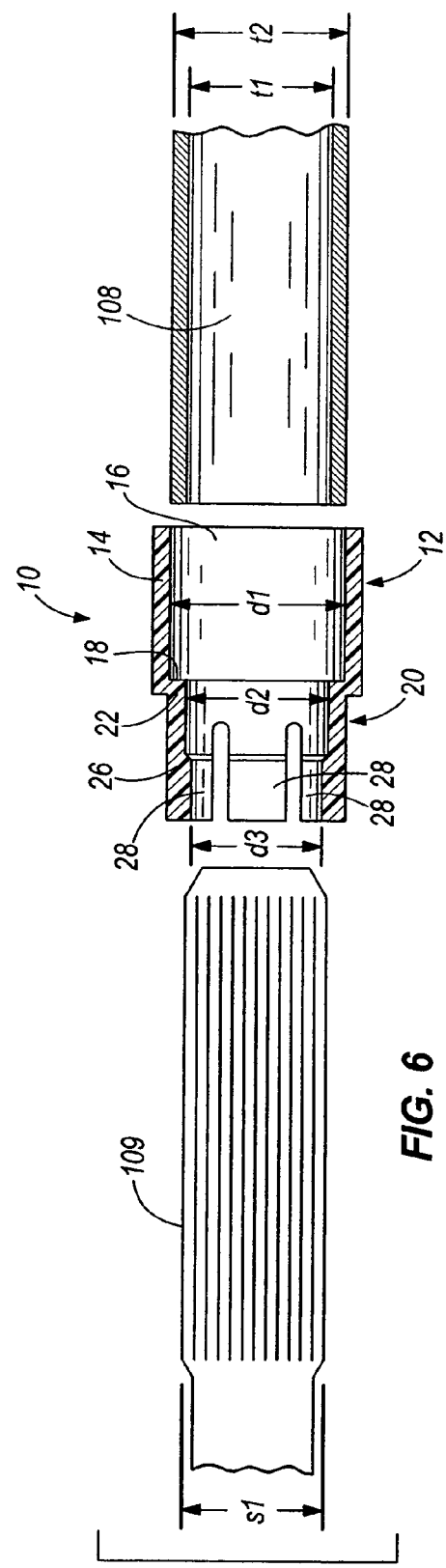
FIG. 6 is a side elevation view similar to FIG. 5 with the clearance damping element and the tube shown in cross-section.

Referring to FIGS. 3–6, a clearance damping element 10 that is a first embodiment of the present invention will be described. The clearance damping element 10 includes a tube engaging portion 12 and a shaft engaging portion 20. The tube engaging portion 12 of the present embodiment generally comprises a cylindrical body 14 having an open end 16 and terminating in a shoulder 18 at the opposite end. As shown in FIG. 6, the cylindrical body 14 preferably has an inner diameter d1 that is substantially equal to or slightly smaller than the outer diameter t2 of the tube 108. As such, the tube 108 fits within the cylindrical body 14 with an interference fit. While an interference fit is preferred, other engaging means, for example, welding, shrink fitting, adhesive or the like may be utilized.

The shaft engaging portion 20 of the clearance damping element 10 has a cylindrical body 22 that extends from the tube engaging portion 12 cylindrical body 14. As can be seen in FIG. 6, the cylindrical body 22 has an inner diameter d2 that is less than the tube outer diameter t2 such that the cylindrical body 22 defines the shoulder 18 of the tube engaging portion 12. The cylindrical body 22 inner diameter d2 is approximately equal to the tube inner diameter t1 such that the shaft 109 can be received through the cylindrical body 22 and into the tube 108, as will be described hereinafter.

Figure 1:
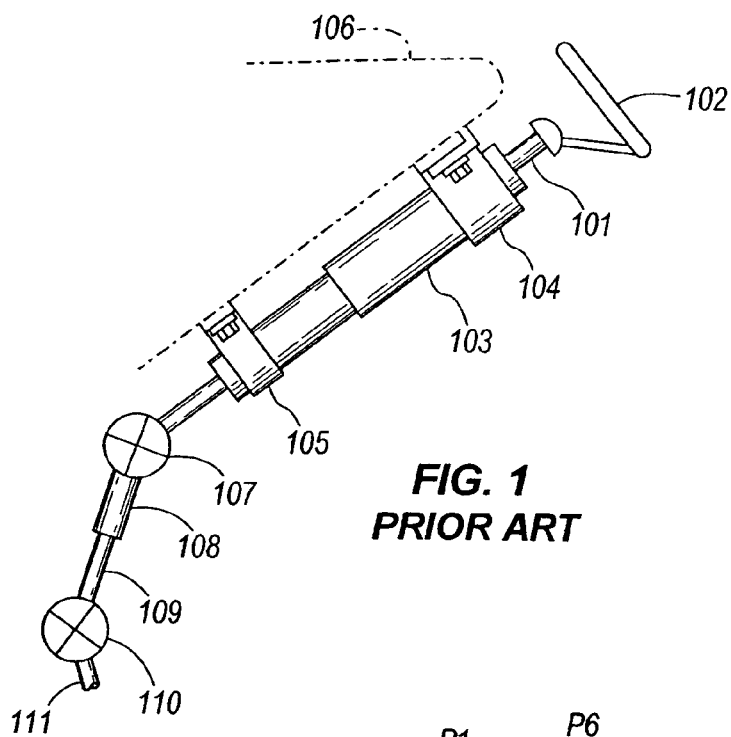
FIG. 1 is a side elevation view of a prior art steering shaft assembly.
Figure 2:
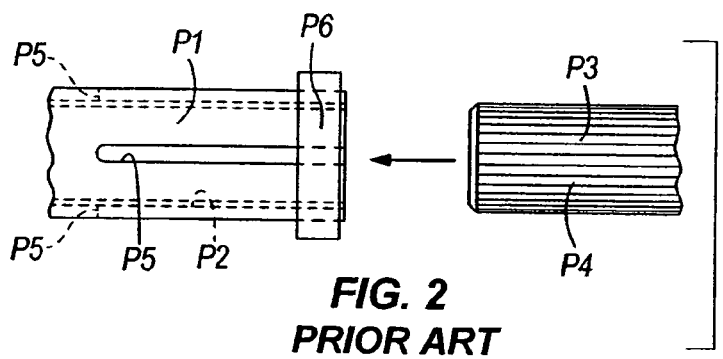
FIG. 2 is a side elevation view of a prior art telescoping shaft assembly.
Figure 3:
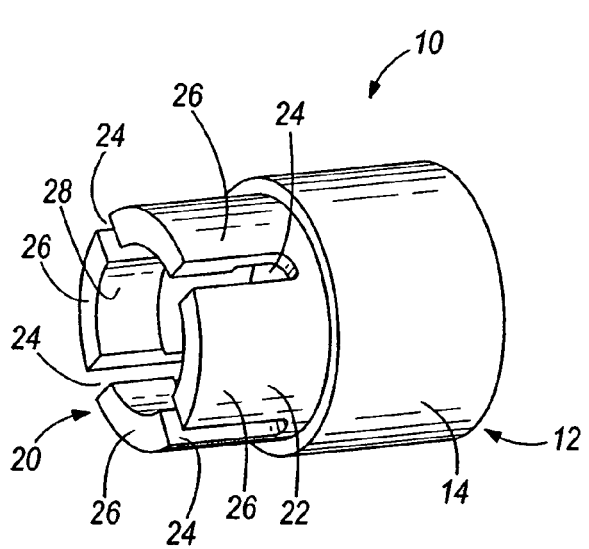
FIG. 3 is a front isometric view of a clearance damping element of a first embodiment of the present invention.
Figure 4:
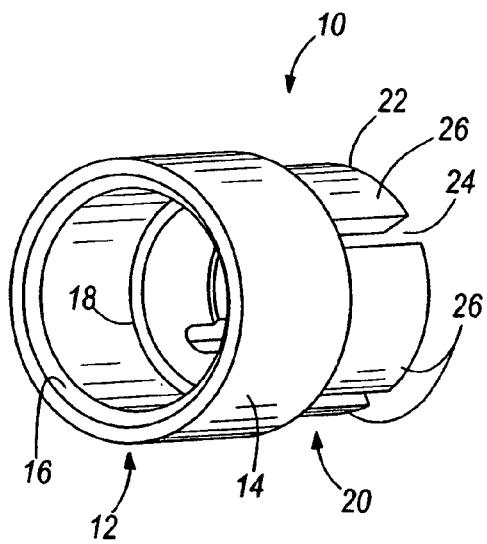
FIG. 4 is a rear isometric view of the clearance damping element of FIG. 3.
Figure 5:
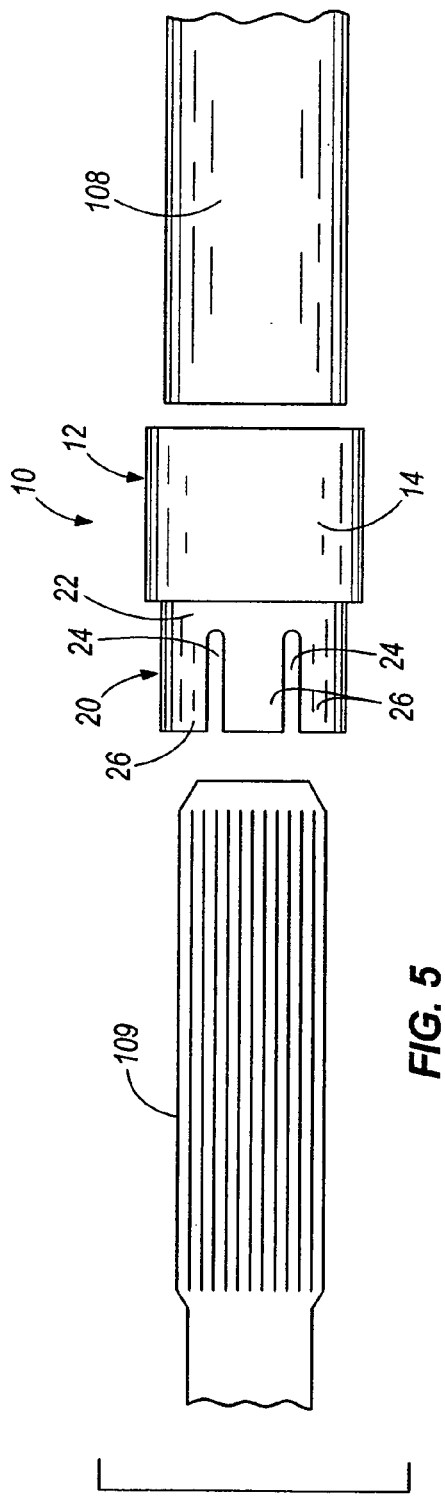
FIG. 5 is a side elevation view of the clearance damping element of FIG. 3 positioned between a shaft and corresponding tube.

Referring to FIG. 3, the cylindrical body 22 has a plurality of radially spaced axial slots 24 such that a plurality of fingers 26 are defined at the forward end of the cylindrical body 22. The slots 24 preferably have an axial length approximately three-quarters the axial length of the cylindrical body 22 such that the fingers 26 have some radial flexibility. The present embodiment is shown with four axial slots 24 and four corresponding fingers 26, however, more or fewer slots 24 and fingers 26 may be provided.

As shown in FIGS. 3 and 6, each finger 26 preferably includes an inwardly extending projection 28 adjacent the forward end of the respective finger 26. While all fingers 26 preferably have a projection 28, less than all may be provided with such. The inwardly extending projections 28 provide a reduced diameter d3 at the forward end of the shaft engaging portion 20, the reduced diameter d3 being less than the outer diameter s1 of the shaft 109 when the fingers 26 are in a relaxed, unbiased condition such that the projections 28 engage the shaft 109 as will be described hereinafter. The projections 28 are illustrated as flat pads, but may have other configurations.

Referring to FIGS. 7 and 8, assembly of the clearance damping element 10 with the shaft 109 and tube 108 will be described. Referring to FIG. 7, the shaft 109 is extended through the shaft engaging portion 20 and out through the open end 16 of the tube engaging portion 12. As the shaft 109 is extended through the shaft engaging portion 20, the projections 28 contact the larger diameter shaft 109 such that the fingers 26 are flexed outward. The flexing of the fingers 26 causes a cantilever effect on the fingers 26, causing the fingers 26 and associated projections 28 to exert an inward dampening force upon the shaft 109 that does not prevent relative axial movement between the shaft 109 and tube 108. As shown in FIG. 8, with the clearance damping element 10 in a generally desired position on the shaft 109, the tube 108 is slid over the shaft 109 and into the open end 16 of the tube engaging portion 12. As explained above, the tube engaging portion 12 has an interference fit with respect to the tube 108 or is otherwise secured relative to the tube 108. With the tube engaging portion 12, and thereby the clearance damping element 10, fixed to the tube 108, the inward force of the fingers 26 and projections 28 against the shaft 109, the relative radial movement between the shaft 109 and tube 108 is minimized, reducing the play or lash in the shaft assembly.

The size and number of the axial slots 24 and fingers 26, the material and material thickness, and the projection 28 size, configuration and depth are chosen such that the projections 28 provide a desired damping force against the shaft 109. The force is preferably such that the shaft 109 and tube 108 may still be moved axially relative to each other to allow some flexibility during assembly. Additionally, while it is described to assemble the clearance damping element 10 to the shaft 109 first, it is also possible to affix the clearance damping device to the tube 108 first.

The clearance damping element 10 is preferably manufactured from a polymer, but may also be manufactured from other materials. While the tube engaging portion body 14 and the shaft engaging portion body 22 are each described as cylindrical, other shapes, for example, oval or square, may be utilized to correspond to the shapes of the shaft 109 and tube 108.

Figure 13:
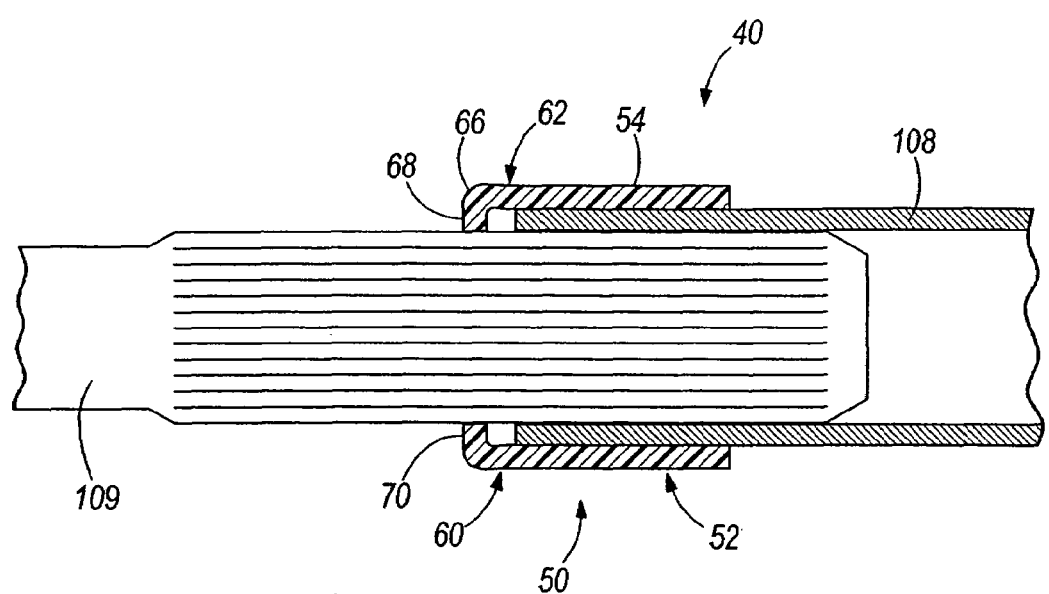
FIG. 13 is a side elevation view similar to FIG. 8 showing the clearance dampening element of FIG. 9 positioned relative to the shaft and tube.

Referring to FIGS. 9, 10, and 13, a telescoping shaft assembly 40 incorporating a clearance damping element 50 that is a second embodiment of the present invention is shown. The clearance damping element 50 includes a tube engaging portion 52 and a shaft engaging portion 60. The tube engaging portion 52 includes a body 54 having an open end 56 and having a diameter d5 configured to interference fit about the tube 108. The shaft engaging portion 60 has a body 62 that is generally an extension of the tube engaging portion body 54, being coplanar on the inner and outer surfaces therewith. A phantom line is provided in FIGS. 9 and 10 to distinguish the portions, although they are generally formed of a single cylinder or other desired shape. As in the previous embodiment, a plurality of axial slots 64 extend into the shaft engaging portion body 62 such that a plurality of fingers 66 are defined. A projection 68 extends inwardly at the forward end of each finger 66 to define an area of reduced diameter d6. Again, diameter d6 is less than the outside diameter s1 of the shaft 109 when the fingers 66 are in a relaxed, unbiased condition, so that when assembled, the fingers 66 and projections 68 are configured to apply a dampening force to the shaft 109 but do not prevent relative axial movement between the shaft 109 and tube 108. In the present embodiment, each of the projections 68 includes a series of splines 70 along an inner edge for engaging with the splined surface of the shaft 109. However, splines are not required on the projection or on the shaft 109.

As in the previous embodiment, the shaft 109 is extended through the shaft engaging portion 50 such that the projections 68 contact the larger diameter shaft 109. The fingers 66 are flexed outward with a resultant cantilever effect on the fingers 66, causing the fingers 66 and associated projections 68 to exert an inward force upon the shaft 109. The size and number of the axial slots 64 and fingers 66, the material and material thickness, and the projection 68 size, configuration and depth are chosen such that the projections 68 provide a desired damping force against the shaft 109. While the tube engaging portion body 54 and the shaft engaging portion body 62 are each described as cylindrical, other shapes, for example, oval or square, may be utilized to correspond to the shapes of the shaft 109 and tube 108.

Figure 11:
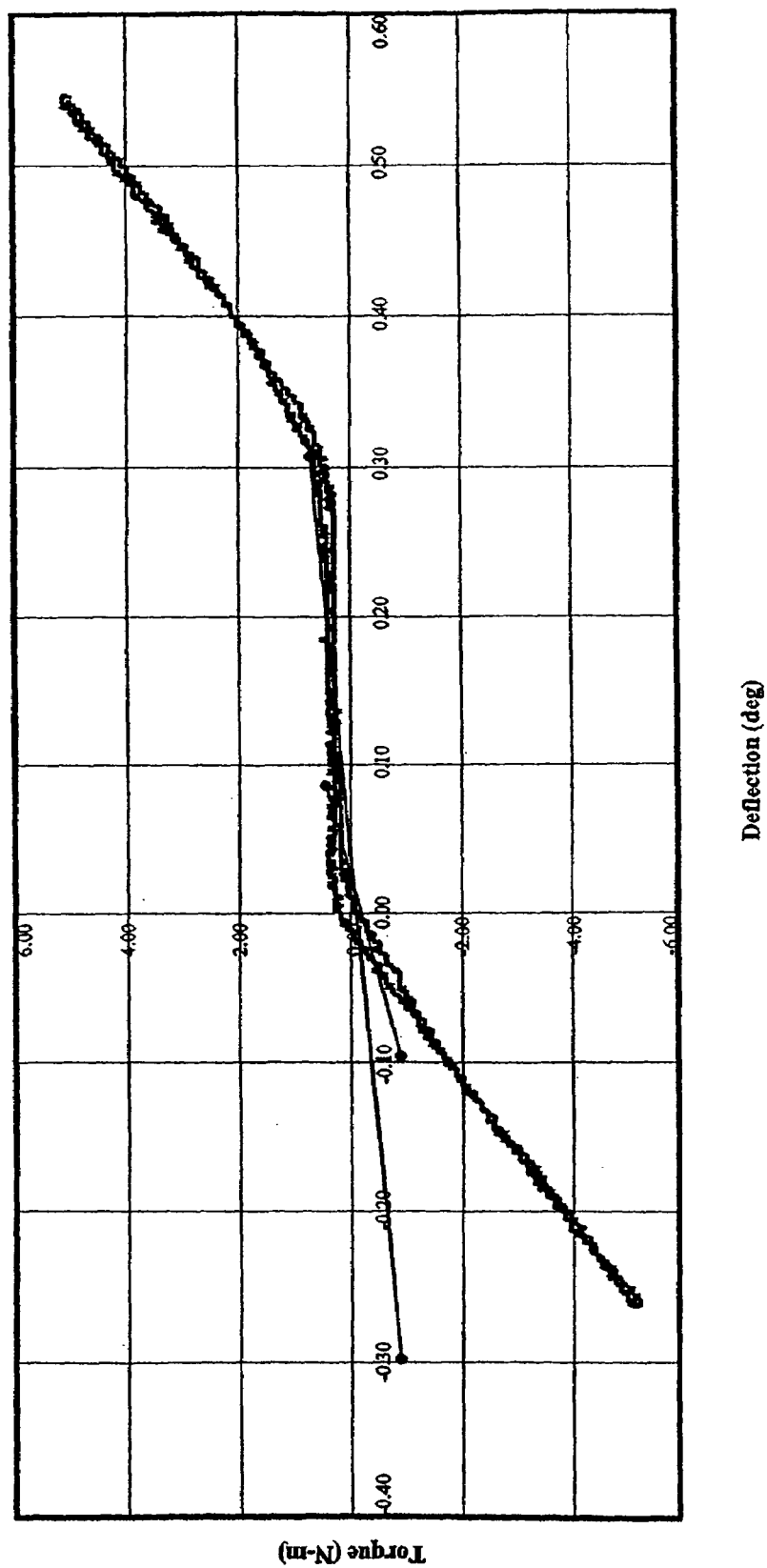
FIG. 11 shows a hysteresis curve for a telescoping shaft assembly without a damping element.
Figure 12:
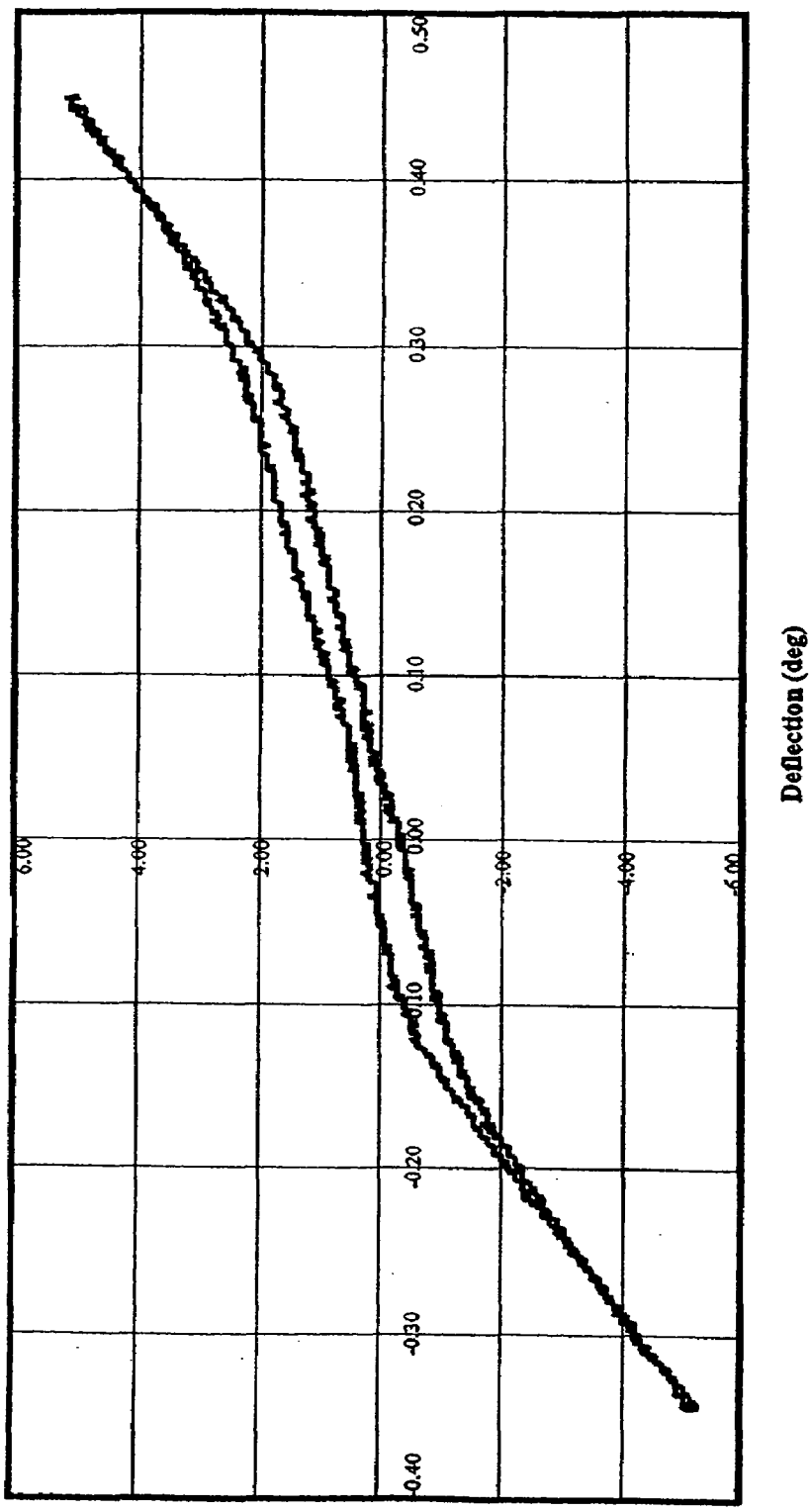
FIG. 12 shows a hysteresis curve for a telescoping shaft assembly with a clearance damping element of the present invention positioned between the shaft and tube.

Referring to FIGS. 11 and 12, the effect of the clearance damping element 10, 50 is observed by comparing the two graphs. The graph of FIG. 10 is a hysteresis curve showing torque versus deflection for a steering shaft assembly that does not utilize a clearance damping element. The graph of FIG. 11 is a hysteresis curve showing torque versus deflection for a steering shaft assembly utilizing a clearance damping element according to the present invention. Comparison shows that the clearance damping element serves to alter the deflection characteristic of the shaft assembly such that the slope of the deflection curve is maintained as the applied torque from a clockwise direction passes through zero to a counterclockwise direction. Maintaining a slope through this "zone" results in a lower impact energy potential as the components begin to transmit torque during rapid direction change.

What is claimed is:

1. A telescoping shaft assembly including
a shaft having a shaft outer diameter;
a tube configured to receive the shaft therein, the tube having a tube outer diameter;
a clearance damping element comprising:
a tube engaging portion having a body having first and second ends and adapted to fixedly receive the tube; and
a shaft engaging portion having a body extending from the second end of the tube engaging portion body, the shaft engaging portion body having a plurality of radially spaced axial slots therealong to define a plurality of flexible fingers, at least two of the fingers having inward extending projections such that the fingers define an inner diameter less than the shaft outer diameter when the fingers are in a relaxed, unbiased condition, the fingers and projections configured such that the fingers apply a dampening force to the shaft but do not prevent relative axial movement between the shaft and tube.

2. The telescoping shaft assembly of claim 1 wherein each finger includes an inward extending projection.

3. The telescoping shaft assembly of claim 1 wherein the shaft engaging portion body has a given axial length and each axial slot has an axial length less than the given axial length.

4. The telescoping shaft assembly of claim 3 wherein each axial slot has an axial length about three-quarters of the given axial length.

5. The telescoping shaft assembly of claim 1 wherein the shaft engaging portion body has four axial slots.

6. The telescoping shaft assembly of claim 1 wherein the shaft engaging portion and the tube engaging portion are each manufactured from a polymer.

7. The telescoping shaft assembly of claim 1 wherein the shaft engaging portion body and the tube engaging portion body each have a cylindrical configuration.

8. The telescoping shaft assembly of claim 1 wherein the shaft engaging portion body and the tube engaging portion body have coplanar inner and outer surfaces.

9. The telescoping shaft assembly of claim 1 wherein the shaft engaging portion body has an inner diameter less than an inner diameter of the tube engaging portion body such that the shaft engaging portion body defines a shoulder at the second end of the tube engaging portion body.

10. The telescoping shaft assembly of claim 1 wherein each projection has splines along an inner edge.

11. The telescoping shaft assembly of claim 1 wherein a tube engaging portion body has an inner diameter less than or equal to the tube outer diameter such that there is an interference fit therebetween.

* * * * *